United States Patent [19]
Asawa et al.

[11] Patent Number: 5,775,178
[45] Date of Patent: Jul. 7, 1998

[54] WAVE GEAR DEVICE

[75] Inventors: Hideo Asawa; Naomi Shirasawa, both of Nagano-ken, Japan

[73] Assignee: Harmonic Drive Systems, Inc., Tokyo, Japan

[21] Appl. No.: 722,797

[22] Filed: Sep. 27, 1996

[30] Foreign Application Priority Data

Sep. 29, 1995 [JP] Japan .................................. 7-251702

[51] Int. Cl.$^6$ ................................................ F16H 1/00
[52] U.S. Cl. .................................................... 74/640
[58] Field of Search ...................................... 74/640

[56] References Cited

U.S. PATENT DOCUMENTS

| | | | |
|---|---|---|---|
| 4,770,059 | 9/1988 | Beyer | 74/640 |
| 4,909,098 | 3/1990 | Kiryu | 74/640 |
| 5,388,483 | 2/1995 | Ishida et al. | 74/640 |

Primary Examiner—Dirk Wright
Attorney, Agent, or Firm—Burns, Doane Swecker & Mathis LLP

[57] ABSTRACT

A wave gear device has a circular spline, a flexspline arranged within the circular spline, and a wave generator disposed within the flexspline for deflecting the flexspline in radial direction for partially engaging external tooth formed on the flexspline with internal gear teeth formed on the circular spline and shifting an engaging position in circumferential direction to cause relative rotation depending upon difference in number of teeth of the internal gear teeth and the external gear teeth between the circular spline and the flexspline. The circular spline has an annular rigid teeth portion formed with the internal gear teeth along the inner periphery thereof, a fastening portion to be rigidly secured on one of a device housing and a supporting member rotatably supported in the device housing, and a connecting portion connecting the rigid teeth portion and the fastening portion. The connecting portion has a low rigidity at least in one of a direction of an axis of the device and a direction perpendicular to the axis, in comparison with that of the rigid teeth portion.

11 Claims, 3 Drawing Sheets

WAVE GEAR DEVICE

BACKGROUND OF THE INVENTION

1. Field of the Invention

The present invention relates generally to a wave gear device. More specifically, the invention relates to a wave gear device which can avoid occurrence of problems, such as deformation of a flexspline or a circular spline forming the wave gear device, due to error in assembling components.

2. Description of the Related Art

A wave gear device can be constructed with small number of components and attain a high reduction ratio. Therefore, the wave gear device have been used with assembling to an actuator requiring precise driving, or so forth.

A typical wave gear device includes a circular spline, a flexspline arranged within the circular spline and a wave generator engaged within the flexspline and having an elliptic contour. The flexspline is deflected in radial direction by the wave generator, and external teeth of the flexspline are meshed with internal teeth of the circular spline at both end positions in a longer axis direction of the elliptic-shaped configuration.

When the wave generator is driven to rotate at high speed by a motor shaft, these two meshing positions are shifted circumferentially. Here, difference in number of teeth between the external teeth and the internal teeth is 2n (n in positive integer), and is generally set at 2. Accordingly, depending upon difference in number of teeth, relative rotation is caused between the circular spline and the flexspline. In general, since the circular spline is fixed to a device housing, the flexspline is rotated at a rotational spend significantly lowered in comparison with an input speed at the wave generator. The reduced rotation is transmitted to a member to be driven.

As the wave gear device, there are a cup-type wave gear device having a cup-shaped flexspline and a silk hat-type wave gear device having a silk hat-shaped flexspline. Also, a flat-type wave gear device having a configuration, in which internal teeth are formed on the inner peripheral surface of a flexible cylindrical member in simple annular configuration.

In such wave gear devices, even when the flexspline and the circular spline are machined precisely, upon assembling or mounting, if machining precision or assembling precision of other members, to which these are assembled, are poor, substantial stress can be exerted on the flexspline or the circular spline to be assembled. When error in assembling is large, deflection can be caused in each gear. Particularly, when deformation is caused on the circular spline which should not be deformed, engagement failure or other failure in caused between the internal teeth and the external teeth to adversely affect for operation of the wave gear device.

SUMMARY OF THE INVENTION

The present invention has been worked out in view of the drawbacks in the prior art as set forth above. Therefore, it is an object of the present invention to provide a wave gear device which may avoid occurrence of deformation in an internal gear even when substantial stress is caused on a circular spline due to error in assembling.

According to one aspect of the invention, a wave gear device comprises:

a circular spline:

a flexspline arranged within the circular spline;

a wave generator disposed within the flexspline for deflecting the flexspline in a radial direction for partially engaging external teeth formed on the flexspline with internal gear teeth formed on the circular spline and shifting an engaging position in a circumferential direction to cause relative rotation depending upon difference in number of teeth of the internal gear teeth and the external gear teeth between the circular spline and the flexspline;

wherein the circular spline has an annular rigid teeth portion formed with the internal gear teeth along the inner periphery thereof, a fastening portion to be rigidly secured on one of a device housing and a supporting member rotatably supported in the device housing, and a connecting portion connecting the rigid teeth portion and the fastening portion, the connecting portion having low rigidity at least in one of a direction of an axis of the device and a direction perpendicular to the axis, in comparison with that of the rigid teeth portion.

In the preferred construction, the circular spline has the annular rigid teeth portion formed with the internal gear teeth on the inner periphery and having a rectangular cross section, and the connecting portion integrally formed with the rigid teeth portion and extending from one of an outer peripheral surface or an annular end face of the rigid teeth portion, wherein the connecting portion is an annular plate having smaller thickness than that in an axial direction of the right teeth portion.

The flexspline may be a cup-type flexspline having a cylindrical body portion, an annular diaphragm formed integrally with the body portion in a condition closing one and opening of the body portion, a boss integrally formed with the diaphragm and located at the center of the latter, and an external gear teeth formed at the other end opening of the body portion and extending along the outer peripheral surface. In the alternative, the flexspline may be a silk hat-type flexspline having a cylindrical body portion, an annular diaphragm formed integrally with the body portion and extending in radially outward from one end opening of the body portion, an annular boss integrally formed with the outer peripheral edge of the diaphragm, and an external gear teeth formed at the other end opening of the body portion and extending along the outer peripheral surface.

The wave gear device may further comprise:

first and second end plates located at both axial ends of the device;

an input shaft extending through the center of the wave generator and having one end rotatably supported on the first end plate and the other end rotatably supported on the second end plate; and a cross roller bearing disposed on the outer periphery of the cylindrical body portion of the flexspline, and having an outer ring fixed to the second end plate via the annular boss and an inner ring fixed to the first and plate via the circular spline, wherein the silk hat-type flexspline is arranged between the first and second end plates having an opening at the first end plate side, the fastening portion of the circular spline is positioned on the outer periphery of the flexspline being rigidly secured in a condition clamped between the inner ring of the cross roller bearing and the first end plate, the first end plate forms one side of the device housing or the supporting member, and the second end plate forms the other side of the device housing or the supporting member.

According to another aspect of the invention, a wave gear device comprises:

a rigid first gear element;

a flexible second gear element internally disposed within the first gear element;

an input shaft rigidly connected to one of the first and second gear elements;

a wave generator disposed internally disposed with the second gear element for establishing local gear engagement between the first and second gear elements with circumferentially shifting local gear engagement for transmitting an input rotation to the other or the first ad second gear elements for transmission of rotation to a driving load through the other of the first and second gear element at reduced speed; and a stress absorbing means incorporated in the first gear element for deflecting in response to exertion of stress on the first gear element in order to absorb stress for avoiding engaging failure at local gear engagement between the first and second gear elements.

The stress absorbing means may be a flexible member radially extending for supporting an annular gear member of the first gear element. The flexible member may be formed integrally with the annular gear member.

In practice, the flexible member may extend radially outward from one of an outer peripheral surface and an axial end face of the first gear element.

The wave gear device may further comprises a cross roller bearing disposed between a stationary component of the wave gear device and the first gear element. The cross roller bearing preferably includes an inner ring, an outer ring cooperated with the inner ring for defining a space therein and a plurality of rollers alternatively disposed within the space in mutually perpendicular orientations.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiments of a wave gear device according to the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
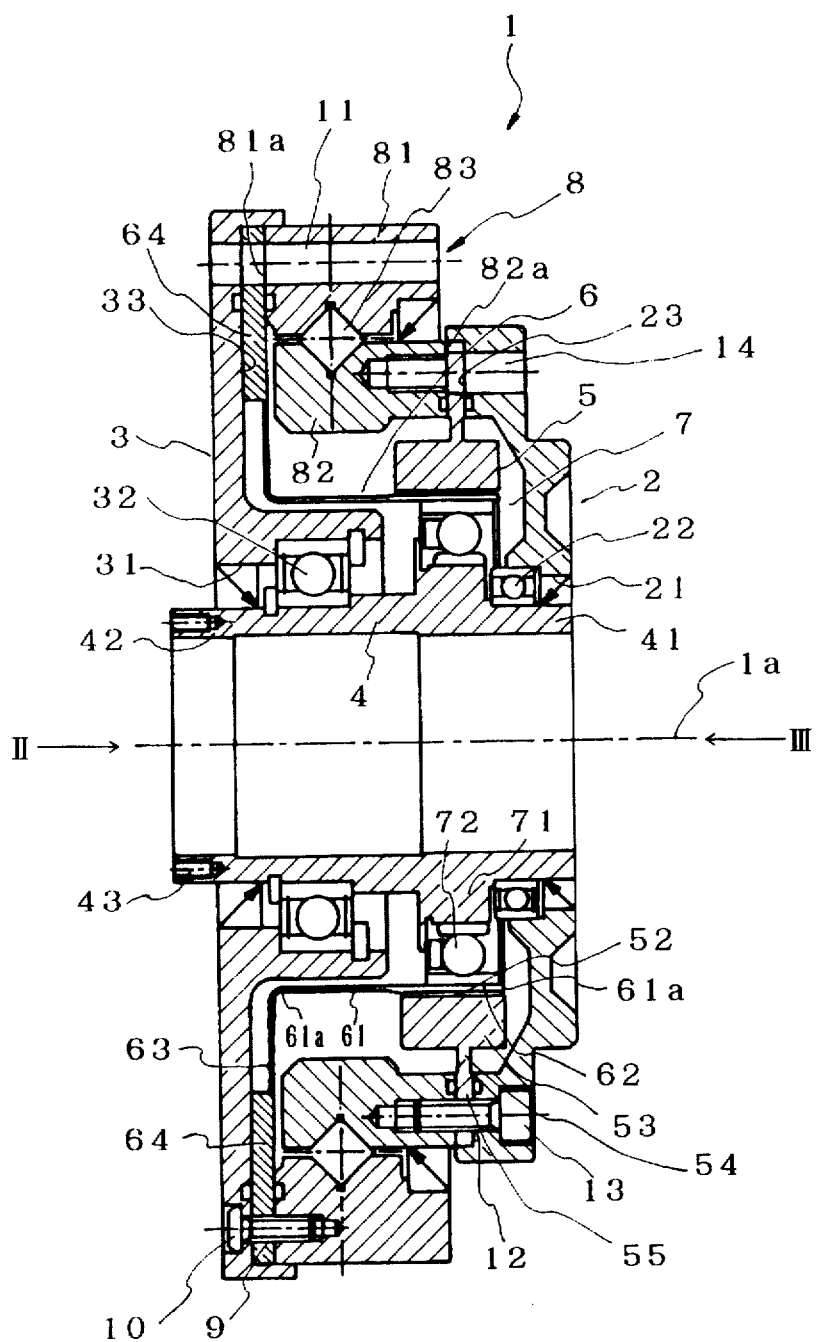
FIG. 1 is a longitudinal, sectional view of the preferred embodiment of a wave gear device according to the present invention as sectioned along an axis of the device.
Figure 2:
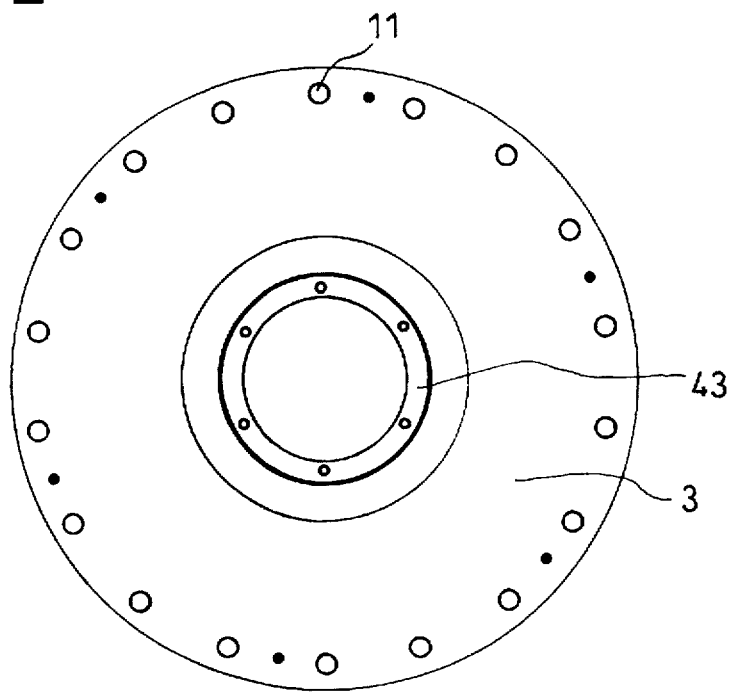
FIG. 2 is a side elevational view of the preferred embodiment of the wave gear device as viewed along an arrow II.
Figure 3:
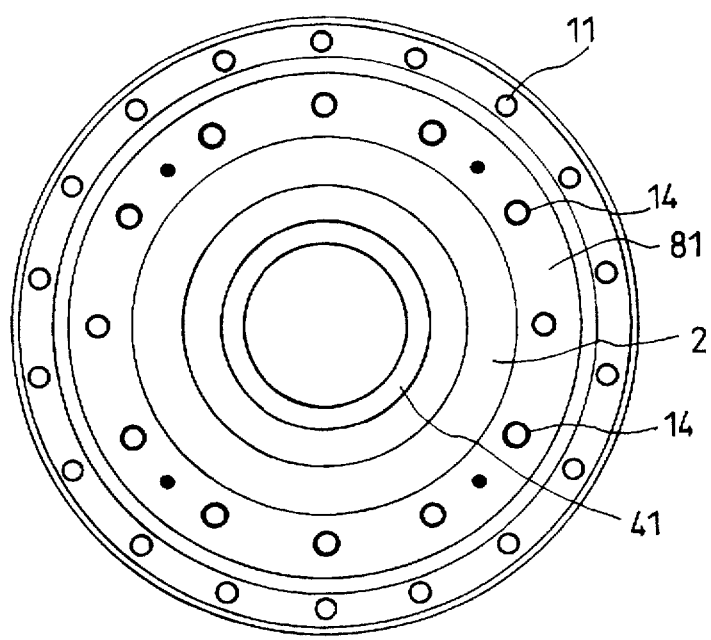
FIG. 3 is a side elevational view of the preferred embodiment of the wave gear device as viewed along an arrow III.

FIGS. 1 to 3 show the preferred embodiment of a wave gear device according to the present invention. The shown embodiment of a wave gear device 1 is defined on both ends in a direction of axis 1a by first and second annular end plates 2 and 3 respectively having center bores 21 and 31. On the inner periphery of the center bore 21 of the first end plate 2, a bearing 22 is fixed. By this bearing 22, on one end 41 of a hollow input shaft 4 extending through the center bore 21 is rotatably supported. Similarly, on the inner periphery of the center bore 31, a bearing 32 is fixed. By the bearing 32, the other end of the hollow input shaft 4 expending through the center bore 31 is rotatably supported. It should be noted that, in the shown embodiment, the other end 42 of the input shaft 4 in externally projected from the center bore 31. On an annular end face of the other end 42 of the input shaft 4 extended from the end plate 3 is formed with a plurality of bolt receptacle bores 43. With utilizing these bolt receptacle bores 43, an output shaft (not shown) of a motor is fixedly connected.

Between these first and second end plates 2 and 3, a wave gear mechanism in assembled. The wave gear mechanism is formed with a circular spline 5, a silk hat-type flexspline 6 and a wave generator 7. The flexspline 6 is formed with a cylindrical body portion 61, an external gear tooth 62 formed on the outer periphery of one opening end 61a of the body portion, an annular diaphragm 63 continuous with the other opening end 61b of the body portion 61 and extending radially outward perpendicularly to the body portion, and an annular boss 64 having greater thickness than the diaphragm 63 end being continuous to the external peripheral edge of the diaphragm.

On the outer circumference of the external gear teeth 62, the circular spline 5 is arranged. The internal gear teeth formed on the inner periphery of the circular spline 5 is engageable with the external gear teeth 62 of the flexspline 6. Within the body portion 61, on which the external gear teeth 62 is formed, the wave generator 7 is assembled.

The wave generator 7 is constructed with a rigid cam plate 71 having an elliptic contour and a bearing 72 engaged on the outer peripheral surface of the rigid cam plate 71. In the shown embodiment, the rigid cam plate 71 is formed integrally with the outer peripheral surface of the hollow input shaft 4. Of course, it is also possible to form the rigid cam plate 71 separately from the input shaft 4 and to fixedly secure the separately formed rigid cam plate 71 on the outer periphery of the input shaft 4.

With the wave generator 7, a portion of the body, portion 61, on which the external gear teeth of the flexspline 6 is formed, is deflected into elliptic configuration to engage with the internal gear teeth 52 at both ends in the longer axis direction. When the input shaft 4 is rotated, the wave generator 7 is integrally rotated. Associating with this, meshing positions of the external gear teeth 62 and the internal gear teeth 52 are shifted in the circumferential direction. In general, the number of the gear teeth in the external gear teeth 62 is smaller than that in the internal gear teeth 52 by 2n (n in positive integer), for example, 2. Accordingly, when the meshing positions are shifted in the circumferential direction, a relative rotation which is significantly reduced in comparison with the input rotation speed, is generated between the flexspline and the circular spline. This rotation with the reduced rotational speed is taken from the circular spline side and transmitted to the member to be driven (not shown). The principle of operation in speed reduction is known and is not required to be discussed in further detail.

Next, on the outer periphery of the body portion 61 of the flexspline 6 and the circular spline 5, a cross roller bearing 8 is arranged. The cross roller bearing 8 is constructed with an outer ring 81, an inner ring 82, cylindrical rollers rotatably arranged within an annular groove defined between the outer ring and the inner ring with alternatively intersecting at right angle.

In the shown embodiment, between an annular end face 81a of the outer ring 81 of the cross roller bearing 8 and an inner end face 33 of the second end plate 3 opposing to the annular end face, the annular boss 64 of the flexspline 6 is arranged in the condition clamped at both sides. In these three members 3, 64 and 81, a plurality of fastening bolt receptacle holes 9 are formed in circumferential alignment. With the fastening bolts 10 engaged with the fastening bolt receptacle holes 9, these three members 3, 64 and 81 are fixed. On the other hand, through these three members, a plurality of bolt receptacle holes 11 are formed in circumferential alignment. Utilizing theme bolt receptacle holes 11, the second end plate 3 is rigidly mounted on the stationary member (not shown), such as a motor housing and so forth.

On the other hand, between the annular end face 82a of the inner ring 82 of the cross roller bearing 8 and the inner end face 23 of the first end plate 2 opposing to the annular end face 82a, the circular spline 5 is arranged in a condition clamped at both sides. In these three members 82, 5 and 2, a plurality Of fastening bolt receptacle holes 12 are formed in circumferential alignment. With fastening bolts 13 engaged to the fastening bolt receptacle holes 12, these three members are fixed. On the other hand, through these three members, a plurality of bolt receptacle holes 14 are formed in circumferential alignment. With utilizing these bolt receptacle holes 14, the end plate 2 of the shown embodiment of the device 1 is rigidly mounted on the member to be driven (not shown).

Here, the shown embodiment of the circular spline 5 is formed into the following shape. The shown embodiment of the circular spline 5 has an annular rigid tooth portion 53 of rectangular section, where the internal gear teeth is formed on the inner peripheral surface, an annular connecting portion 54 continuously extending outwardly in the radial direction from substantially center portion of the outer peripheral surface, and a fastening portion 55 continuous to the outer peripheral end of the annular connecting portion 54 and extending radially outward. The fastening portion 55 located at the outermost position in clamped between inner and surface 23 of the second end plate 2 and the annular end face 82a of the inner ring 82 of the cross roller bearing 8, and fixedly mounted on these members 2 and 82 by means of the bolts 13.

As can be appreciated from the drawings, the thickness of the connecting portion 54 is quite thin in comparison with the thickness of the rigid teeth portion 53 (thickness in the direction of the axis 1a). Therefore, when external force acts on the circular spline in this shape, stress is concentrated on the connecting portion 54 which is thin and has small rigidity, to initially cause deformation at this portion.

As set forth above, in the shown embodiment of the wave gear device 1, the circular spline 5 is constructed with the rigid teeth portion 53 formed with the internal gear teeth, the connecting portion integrally and continuously formed with the rigid tooth portion 53, and the fastening portion integrally and continuously formed with the connecting portion 54. The connecting portion 54 is formed as the thin annular portion. Accordingly, the rigidity of the connecting portion 54 is low in comparison with the rigid teeth portion 53 and the fastening portion 55, and particularly in comparison with the rigid teeth portion 53.

Accordingly, in the shown embodiment of the wave gear device, since the rigidity if the connecting portion 54 of the circular spline 5 is lower than that of other portions of the circular spline, even if substantial stress is exerted on the circular spline 5 due to error in assembling of respective components or other reason, deformation is initially caused in the connecting portion 54 having low rigidity. Therefore, the stress may not be transmitted to the rigid teeth portion 53 where the internal gear tooth is formed on the inner periphery. Thus, it is successfully avoided to cause deformation of the rigid teeth portion 53 and to cause failure of engagement between the internal gear teeth and the external gear teeth 62 of the flexspline.

On the other hand, in the shown embodiment of the wave gear device 1, it has been employed a construction, in which the input shaft 4 is rotatably supported between the first and second end plates 2 and 3 at both ends, the silk hat type flexspline 6 is arranged between the first and second end plates 2 and 3, and the cross roller bearing 8 is arranged on the outer periphery sides of the body portion of the flexspline 6 and the circular spline 5. Accordingly, the outer ring 81 of the cross roller bearing 8 serves as a part of the device housing covering the outer circumference of the device 1. Therefore, it becomes unnecessary to arrange a separate member as the device housing.

On the other hand, the distance between both end plates 2 and 3, or the length of the device in the direction of the axis 1a is determined depending upon the axial length of the silk hat-type flexspline arranged therebetween. Therefore, when a flat flexspline disclosed in commonly owned Japanese Patent Applications Non. Hei 6-310834 and Hei 6-310835, the wave gear device with quite a short axial length can be obtained.

Furthermore, it becomes possible to change the mounting position of the motor shaft at either the first end plate 2 side or the second end plate 3 side without modifying the configuration and so forth of the circular spline 5, the flexspline and the wave generator 7.

Figure 4:
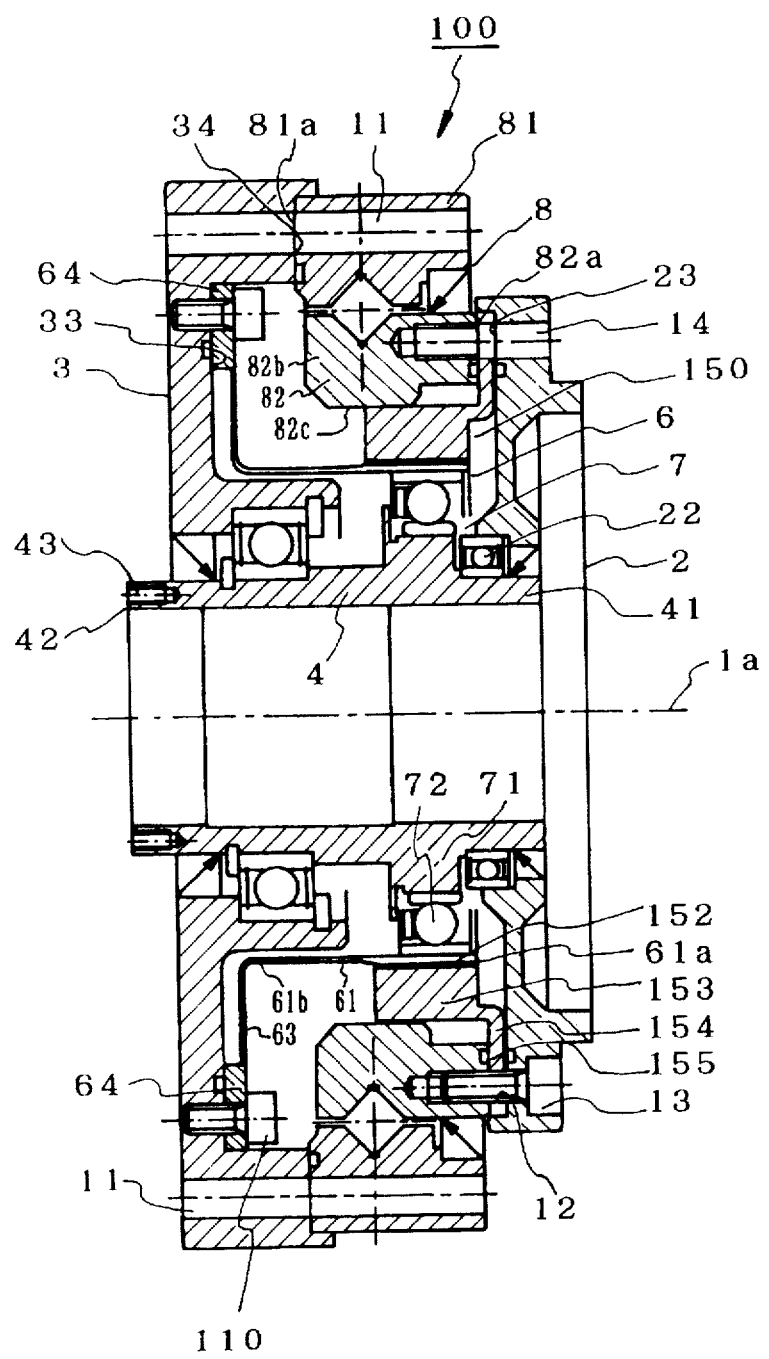
FIG. 4 is a longitudinal, sectional view of another embodiment of a wave gear device according to the present invention an sectioned along an axis of the device.

FIG. 4 shows another embodiment of the wave gear device according to the present invention. The shown embodiment of the wave gear device 100 has basically the same construction an that of the foregoing wave gear device 1 in the first embodiment. The elements corresponding to those in the former embodiment will be denoted by the same reference numerals and discussion therefor will be neglected for maintaining the disclosure simple enough to facilitate clear understanding of the invention. Therefore, the following discussion will be concentrated to the portions where differentiated from the former embodiment.

In the wave gear device 100, the circular spline 150 also has the annular rigid teeth portion 153 formed with internal gear teeth on the inner periphery and having rectangular cross section, a connecting portion 154 formed integrally and continuously with the rigid teeth portion, and a fastening portion 155 formed integrally and continuously with the connecting portion 154. However, in the shown embodiment, the connecting portion 154 is formed continuously with the outer peripheral edge of the annular end face 153a at the first end plate 2 side instead of the outer peripheral surface of the rigid teeth portion 153. The connecting portion is a thin annular plate as a whole and has an inner peripheral end which is bent at a right angle and connected to the annular end face 153a of the rigid teeth portion 153.

The connecting portion 154 in the configuration set forth above has quite low rigidity in both of a direction along the device axis 1a and a direction perpendicular to the axis 1a. Therefore, in the shown embodiment, with respect to the outer peripheral surface 153c of the rigid teeth portion 153 at the side of the annular end face 153b opposite to the connecting portion 154, the inner peripheral surface 82c of the inner ring 81 of the cross roller bearing 8 is placed in spaced apart relationship with a fine clearance. As a result, the rigid teeth portion supported by the connecting portion 154 having low rigidity may not cause significant displacement in radial direction.

On the other hand, in the shown embodiment, the annular end face 81a of the outer ring 81 of the cross roller bearing 8 is directly fastened and secured on the annular projecting face 34 formed at the side of the outer peripheral edge of the inner end dace of the second end plate 3 and projecting in the direction of axis 1a. Furthermore, the annular boss 64 of the flexspline 6 is rigidly secured on the inner end face 33 of the second end plate 3.

The shown embodiment of the wave gear device 100 constructed as set forth above may achieve the equivalent effect to the first embodiment of the wave gear device as set forth above.

As set forth above, with the wave gear device according to the present invention, the circular spline as the component of the device is constructed with the rigid tooth portion formed with the internal gear teeth on the inner periphery, the fastening portion to be rigidly secured onto the device housing and the connecting portion connecting between the rigid tooth portion and the fastening portion. The rigidity of the connecting portion is set to be such lower than that of the rigid teeth portion. Accordingly, with the present invention, even when substantial stress is exerted on the circular spline due to error of assembling of respective components or other cause, the deformation is initially caused in the connecting portion having low rigidity.

Therefore, substantial stress may not be transmitted to the rigid teeth portion. Thus, it is successfully avoided to cause deformation of the rigid teeth portion and to cause failure of engagement between the internal gear teeth and the external gear teeth of the flexspline.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims. For instance, while the foregoing embodiment employs the hollow input shaft 4, it is not essential that the input shaft is hollow but can be solid. Also, while the shown embodiment employs the silk-hat type flexspline, it is also possible to employ the cup-type flexspline. Furthermore, the present invention is applicable to a flat type wave gear device employing the simple cylindrical flexspline.

What is claimed is:

1. A wave gear device comprising:
  a circular spline:
  a flexspline arranged within said circular spline; and
  a wave generator disposed within said flexspline for deflecting said flexspline in radial direction for partially engaging external teeth formed on said flexspline with internal gear teeth formed on said circular spline and shifting an engaging position in circumferential direction to cause relative rotation depending upon difference in number of teeth of the internal gear tooth and the external gear teeth between said circular spline and said flexspline; wherein said circular spline has an annular rigid teeth portion formed with said internal gear teeth along the inner periphery thereof, a fastening portion to be rigidly secured on one of a device housing and a supporting member rotatably supported in said device housing, and a connecting portion connecting said rigid teeth portion and said fastening portion, and wherein said connecting portion has a low rigidity at least in one of a direction of an axis of the device and a direction perpendicular to the axis, in comparison with that Of said rigid teeth portion.

2. A wave gear device as not forth in claim 1, wherein said circular spline has:
  said annular rigid teeth portion formed with said internal gear teeth on the inner periphery and having a rectangular cross section,
  said connecting portion integrally formed with said rigid teeth portion and extending from one of an outer peripheral surface or in annular end face of said rigid teeth portion, said connecting portion being an annular plate having smaller thickness than the thickness in axial direction of said right teeth portion.

3. A wave gear device as set forth in claim 1, wherein said flexspline is a cup-type flexspline having:
  a cylindrical body portion,
  an annular diaphragm formed integrally with said body portion in a condition closing one end opening of said body portion,
  a boss integrally formed with said diaphragm and located at the center of the latter, and
  an external gear teeth formed at the other end opening of said body portion and extending along the outer peripheral surface.

4. A wave gear device as set forth in claim 1, wherein said flexspline is a silk hat-type flexspline having:
  a cylindrical body portion,
  an annular diaphragm formed integrally with said body portion and extending in radially outward from one end opening of said body portion,
  an annular boss integrally formed with the outer peripheral edge of said diaphragm, and
  an external gear teeth formed at the other end opening of said body portion and extending along the outer peripheral surface.

5. A wave gear device as set forth in claim 4, further comprising:
  first and second end plates located at both axial ends of the device;
  an input shaft extending through the center of said wave generator and having one end rotatably supported on said first end plate and the other end rotatably supported on said second end plate; and
  a cross roller bearing disposed on the outer periphery of the cylindrical body portion of said flexspline, and having an outer ring fixed to said second end plate via said annular boss and an inner ring fixed to said first end plate via said circular spline, wherein said silk hat-type flexspline is arranged between said first and second end plates having an opening at said first end plate side, said fastening portion of said circular spline is positioned on the outer periphery of said flexspline being rigidly secured in a condition clamped between the inner ring of said cross roller bearing and said first end plate, said first end plate forms one side of said device housing or said supporting member, and said second end plate forms the other side of said device housing or said supporting member.

6. A wave gear device comprising:

a rigid first gear element;

a flexible second gear element internally disposed within said first gear element;

an input shaft rigidly connected to one of said first and second gear elements;

a wave generator disposed internally disposed with said second gear element for establishing local gear engagement between said first and second gear elements with circumferentially shifting local gear engagement for transmitting an input rotation to the other of said first ad second gear elements for transmission of rotation to a driving load through said the other of said first and second gear element at reduced speed; and a stress absorbing means incorporated in said first gear element for deflecting in response to exertion of stress on said first gear element in order to absorb stress for avoiding engaging failure at local gear engagement between said first and second gear elements.

7. A wave gear device as met forth in claim 6, wherein said stress absorbing means is a flexible member radially extending for supporting an annular gear member of said first gear element.

8. A wave gear device as set forth in claim 7, wherein said flexible member is formed integrally with said annular gear member.

9. A wave gear device as set forth in claim 8, wherein said flexible member extends radially outward from one of an outer peripheral surface and an axial end face of said first gear element.

10. A wave gear device as set forth in claim 6, further comprising a cross roller bearing disposed between a stationary component of said wave gear device and said first gear element.

11. A wave gear device as set forth in claim 10, wherein said cross roller bearing includes an inner ring, an outer ring cooperated with said inner ring for defining a space therein and a plurality of rollers alternatively disposed within said space in mutually perpendicular orientations.

* * * * *